US009810598B2

(12) United States Patent
Hale

(10) Patent No.: US 9,810,598 B2
(45) Date of Patent: Nov. 7, 2017

(54) SYSTEMS AND METHODS FOR DETERMINING A LEAK RATE THROUGH AN OPENING USING ACOUSTICAL SENSORS

(71) Applicant: SCORE GROUP PLC, Aberdeenshire (GB)

(72) Inventor: Stanley Neil Hale, Kennesaw, GA (US)

(73) Assignee: SCORE GROUP PLC, Aberdeenshire (GB)

(*) Notice: Subject to any disclaimer, the term of this patent is extended or adjusted under 35 U.S.C. 154(b) by 354 days.

(21) Appl. No.: 14/758,226

(22) PCT Filed: Dec. 23, 2013

(86) PCT No.: PCT/US2013/077527
§ 371 (c)(1),
(2) Date: Jun. 27, 2015

(87) PCT Pub. No.: WO2014/105839
PCT Pub. Date: Jul. 3, 2014

(65) Prior Publication Data
US 2016/0011072 A1    Jan. 14, 2016

Related U.S. Application Data

(60) Provisional application No. 61/746,419, filed on Dec. 27, 2012.

(51) Int. Cl.
G01M 3/24 (2006.01)
G01F 1/66 (2006.01)
G01M 3/26 (2006.01)

(52) U.S. Cl.
CPC .............. G01M 3/24 (2013.01); G01F 1/662 (2013.01); G01M 3/243 (2013.01); G01M 3/26 (2013.01)

(58) Field of Classification Search
CPC ................................ G01M 3/24; G01M 3/243
See application file for complete search history.

(56) References Cited

U.S. PATENT DOCUMENTS 3,300,345 A    1/1967 Lyons, Jr.
5,040,409 A    8/1991 Kiewit et al.
(Continued)

FOREIGN PATENT DOCUMENTS

| EP | 1503208 A1 | 2/2005 |
| GB | 2406654 A | 4/2005 |

OTHER PUBLICATIONS

Supplementary Search Report issued for PCT/US2013/077527, dated May 4, 2016.
(Continued)

*Primary Examiner* — Paul West
(74) *Attorney, Agent, or Firm* — Meunier Carlin & Curfman LLC

(57) ABSTRACT

Disclosed herein are various implementations of systems and methods for improving the process and accuracy of converting acoustical signals to leak rates through a structure, such as a closed valve or coupling, using filtering techniques and modal analysis. These systems and methods may be useful for verifying the accuracy of the conventional approaches and inventive processes and systems for improving leak rate quantification using acoustic emissions. For example, a testing apparatus for simulating a leak through a structure and methods for correlating an acoustical signal with a leak rate are disclosed. The information gathered from the testing apparatus and/or correlation methods may be used in the field to determine more accurately the leak rate of a fluid or gas through the structure.

49 Claims, 9 Drawing Sheets

(56) References Cited

U.S. PATENT DOCUMENTS

| | | |
|---|---|---|
| 5,134,876 A | 8/1992 | Robertson et al. |
| 5,341,670 A | 8/1994 | Brook et al. |
| 5,533,383 A | 7/1996 | Greene et al. |
| 5,557,969 A | 9/1996 | Jordan |
| 5,587,534 A | 12/1996 | McColskey et al. |
| 5,648,603 A | 7/1997 | Hanson |
| 5,650,943 A | 7/1997 | Powell et al. |
| 5,929,315 A | 7/1999 | Dunegan |
| 6,041,656 A | 3/2000 | Dunegan |
| 6,062,083 A | 5/2000 | Dunegan |
| 6,173,613 B1 | 1/2001 | Dunegan |
| 6,360,608 B1 | 3/2002 | Dunegan |

OTHER PUBLICATIONS

International Search Report and Written Opinion, issued by the U.S. International Searching Authority in PCT application No. PCT/US2013/077527 dated Apr. 29, 2014.

Dunegan, H., "Location of Leaks in Pipes by Use of Acoustic Emission Modal Ratio Techniques," Nov. 2004, 9 pages.

International Preliminary Report on Patentability, dated Jun. 30, 2015, received in connection with PCT/US2013/077527.

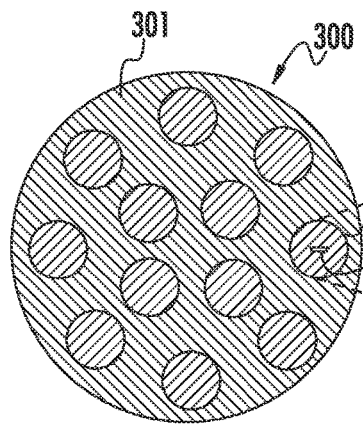
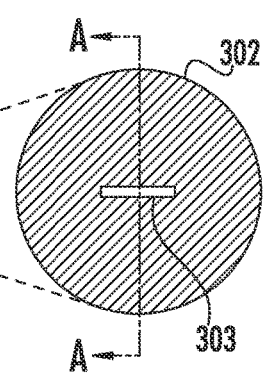
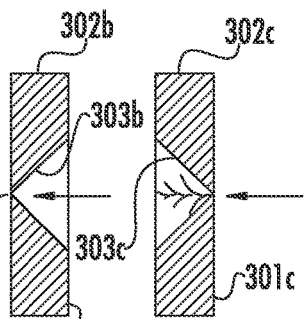
FIG. 3A        FIG. 3B        FIG. 3C
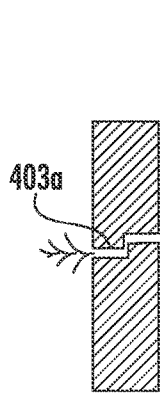
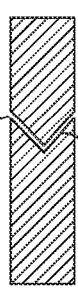
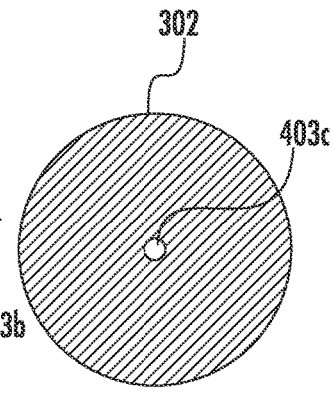
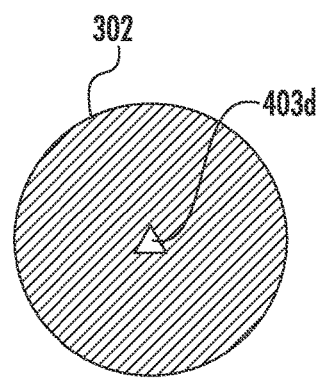
FIG. 4A    FIG. 4B    FIG. 4C        FIG. 4D

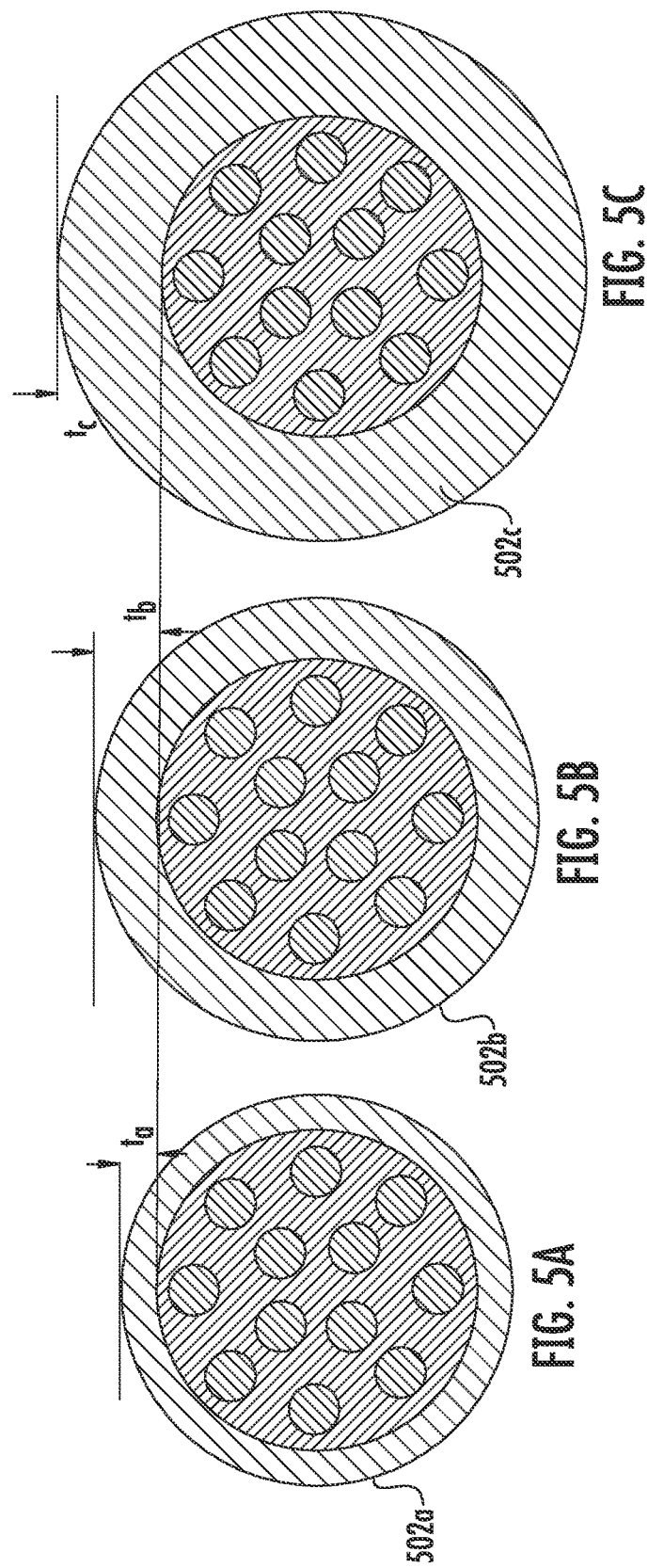

| SENSOR | ASL |
|---|---|
| A | 36 |
| B | 34 |
| C | 32 |
| D | 34 |
| E | 36 |
| F | 38 |
| G | 40 |
| H | 38 |

| SENSOR | HF/LF | MODAL RATIO |
|---|---|---|
| 1 | 46/40 | 1.15 |
| 2 | 44/39 | 1.12 |
| 3 | 39/37 | 1.05 |
| 4 | 42/38 | 1.10 |

SYSTEMS AND METHODS FOR DETERMINING A LEAK RATE THROUGH AN OPENING USING ACOUSTICAL SENSORS

CROSS REFERENCE TO RELATED APPLICATIONS

This application is a 371 of international application no. PCT/US2013/077527, entitled "Systems and Methods for Determining a Leak Rate through an Opening Using Acoustical Sensors," filed Dec. 23, 2013, which claims priority to U.S. Provisional Application No. 61/746,419, entitled "Systems and Methods for Determining a Leak Rate through an Opening Using Acoustical Sensors," filed Dec. 27, 2012, the contents of which are herein incorporated by reference in their entireties.

FIELD OF INVENTION

The present disclosure relates to systems and methods for determining a leak rate through an opening of a structure using at least one acoustical sensor and systems and methods for correlating at least one acoustical signal with a known leak rate.

BACKGROUND OF INVENTION

Acoustic emission (AE) sensors are used widely to capture and record stress waves in materials. These stress waves may be caused by changes in material loads or due to physical changes to the materials by heat or corrosion, or as the material approaches its yield point. AE sensors and signal processing techniques are used to detect leakage of a fluid or gas through a closed valve into a low pressure environment, such as another conduit, the atmosphere, or the ground in the case of a buried pipeline.

Various signal processing techniques and analysis methods have been employed to calculate or estimate a rate of the leakage. Units used for such measurements include liters/minute, gallons/minute, or mass leakage such as kilograms/second. There are at least four commercially available acoustic emission based products for calculating the leak rate based on the AE sensor signal. Three of those systems include the PAC 5131 and versions of the PAC 1278 ASL amplifier for on line monitoring and the SCORE MIDAS Meter. These systems employ similar broadband (e.g., 0 to 1 MHz) AE sensors and associated signal processing. Signal processing includes, for example, calculating and recording the average signal level (ASL) from the AE sensor. The ASL value can be used with lookup tables or in a simple algorithm to estimate the leak rate through the valve. The fourth commercially available product that uses acoustic emission to estimate valve leakage is the VALVEANALYZER marketed by Leak Detection Services (LDS). VALVEANALYZER uses similar broadband AE sensors but requires extended time domain recording of the output signal followed by conversion to the frequency domain using Fourier Transform processes. The analysis is performed manually by one skilled in the art of finding specific peak frequencies in the resulting frequency spectrum using electronic signature analysis techniques.

However, the conversion process from the AE signal level to actual leak rate through a valve with these prior art systems can be inaccurate. The PAC and SCORE products both provide a method of determining the error associated with the conversion process. The error calculated by PAC and SCORE at low confidence is +100/−50% of the calculated value. Thus, actual leakage can be anywhere between half and twice the calculated result. This level of inaccuracy is only available at low (i.e., 1 standard deviation) confidence. If higher confidence is required, such as 2 or 3 sigma, the actual leak rate could be up to 10 times the calculated value. The LDS system does not quote accuracy. It simply identifies the leak as red (large), yellow (not as large), and green (nonexistent or insignificant). High accuracy is required to be "Q-rated" for use in nuclear safety related applications. Accordingly, these existing leak detection systems would benefit from improved accuracy.

BRIEF SUMMARY

Various implementations described herein illustrate the use of filtered acoustical signals to improve the accuracy of processes for calculating leak rate through a structure (e.g., a closed valve or coupling). Some of these implementations may employ modal analysis techniques on the filtered acoustical signals. For example, disclosed below are systems and methods for determining a leak rate through a structure. In addition, a testing apparatus for simulating a leak through a structure and methods for correlating an acoustical signal with a known leak rate are disclosed. The data gathered from the testing apparatus may be used to determine the leak rate through the structure.

A method of determining leak rate of a fluid or gas through at least one opening in a structure may include: (1) receiving at least one acoustical signal associated with a leak from at least one acoustical sensor positioned a known distance from a structure; (2) receiving and separating through filters a low frequency component and a high frequency component of the acoustical signal; (3) calculating a ratio of the low frequency component to the high frequency component; and (4) identifying a leak rate associated with the calculated ratio. Identifying the leak rate associated with the calculated ratio may include executing an algorithm that provides the leak rate. Alternatively, identifying the leak rate associated with the calculated ratio may include retrieving the leak rate associated with the calculated ratio from a memory of a computing device that is configured to store a plurality of ratios and corresponding leak rates. In addition, the leak rate may be associated with the calculated ratio and at least one of the following: a pressure on the structure, a structure wall thickness, a leak path geometry, or a distance to a leak path from the at least one acoustical sensor.

The method may also include using modal analysis techniques to transform the low frequency component and the high frequency component from the time domain to the frequency domain, such as by conducting a Fourier transform of the high and low frequency components. In this implementation, calculating the ratio includes calculating the ratio of the Fourier transformed low frequency component and the Fourier transformed high frequency component. The method may also include determining an average signal level for each of the high frequency component and the low frequency component separately. And, the method may include filtering the acoustical signal into the low frequency component and the high frequency component.

According to various implementations, the structure is a valve or a coupling. In either of these implementations, the opening may be a crack in a surface of the structure or a physical degradation of the valve sealing surface.

An acoustical sensor and computer system are also disclosed. At least one acoustical sensor is configured for disposal adjacent a structure. The computer system includes a computing device, which includes a processor that is in communication with the at least one acoustical sensor and a memory. The processor is configured for: (1) receiving at least one acoustical signal from the at least one acoustical sensor, the acoustical signal including a low frequency component and a high frequency component, (2) calculating a ratio of the low frequency component and the high frequency component, and (3) identifying a leak rate associated with the calculated ratio. The processor may be further configured for filtering the acoustical signal to determine the low frequency component and the high frequency component. In addition, the processor may be configured for applying a Fourier transform to the low frequency component and the high frequency component and calculating the ratio of the Fourier transformed low and high frequency components.

A method of correlating an acoustical signal with a leak rate of a fluid or gas through at least one opening in a structure is also disclosed. The method includes the steps of: (1) receiving at least one acoustical signal from at least one acoustical sensor positioned a known distance from a structure; (2) receiving a low frequency component and a high frequency component of the acoustical signal; (3) calculating a ratio of the low frequency component and the high frequency component; (4) associating the ratio with a known leak rate through the structure; and (5) storing the associated ratio and the known leak rate in a memory of a computing device. The structure may include a valve, a leak simulator, or a coupling, for example. The method may also include the step of associating the ratio and the known leak rate with the type of structure. The type of structure may include, for example, at least one of an associated leak geometry or an associated structure wall thickness. The method may also include the step of associating the ratio and the known leak rate with a pressure on the structure and/or associating the ratio and the known leak rate with a distance to the structure or opening from the at least one acoustical sensor.

A testing apparatus is disclosed that includes: (1) a leak simulator disposed between a high pressure conduit and a low pressure conduit; and (2) a processor in communication with at least one acoustical sensor. The leak simulator includes at least one leakage insert that defines at least one leak path, and the at least one leak path is in fluid communication with the high pressure conduit and the low pressure conduit. The processor is configured for: (1) receiving at least one acoustical signal from the at least one acoustical sensor, the at least one acoustical signal including a low frequency component and a high frequency component which is separated by filtering, (2) calculating a ratio of the low frequency component and the high frequency component, (3) associating the calculated ratio with the leak rate through the leak path, and (4) storing the ratio and the leak rate in a memory of a computing device. The at least one acoustical sensor is disposed adjacent an outer surface of the leakage insert a known distance from the leak path. The leak simulator may also include at least two leakage inserts. The at least two leakage inserts define the leak path through the leak simulator.

The testing apparatus may also include a first pressure transducer configured for receiving a first pressure signal from fluid or gas leak through the high pressure conduit and a second pressure transducer configured for receiving a second pressure signal from fluid or gas leak through the low pressure conduit. The testing apparatus may also include at least one calibrated flow meter configured for recording leak rate of a fluid through the leak path or at least one calibrated bubble counter configured for recording leak rate of a gas through the leak path.

BRIEF DESCRIPTION OF THE DRAWINGS

FIGS. 3A-3C illustrate exemplary valve plate configurations.

FIGS. 4A-4D illustrate exemplary leak paths.

FIGS. 5A-5C illustrate different wall thicknesses around the valve simulation plates.

DETAILED DESCRIPTION

Figure 1:
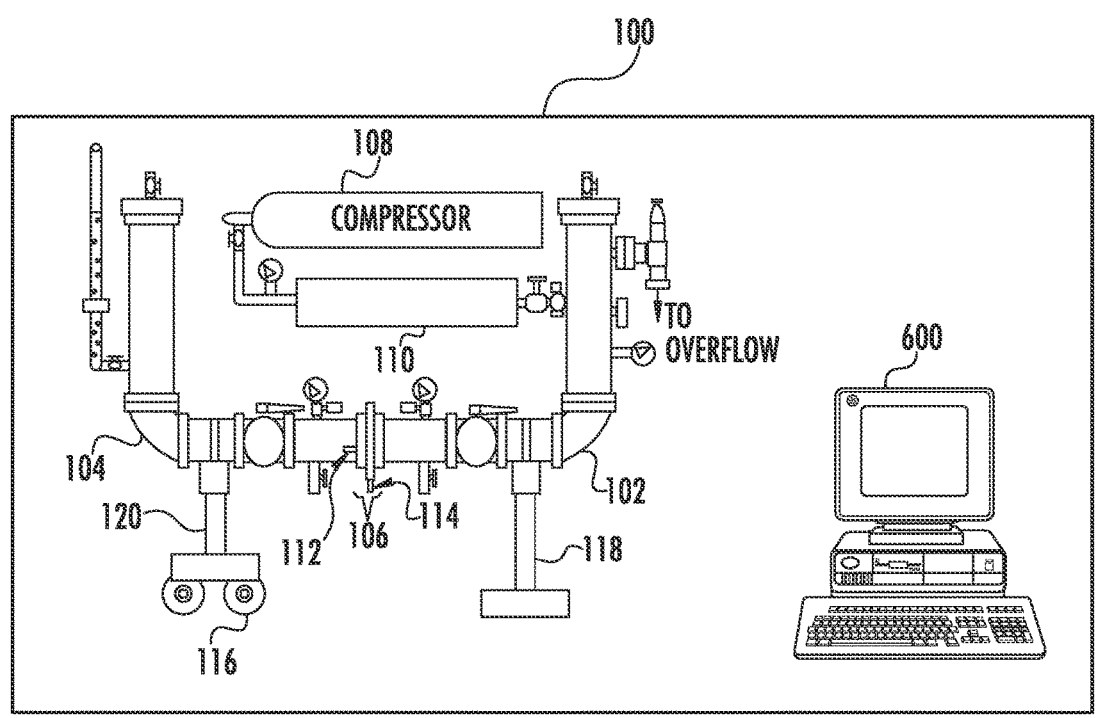
FIG. 1 is a schematic of an exemplary embodiment of a leak simulation system that simulates a leak through a single valve.

Disclosed herein are various systems and methods for improving the accuracy of processes and systems for converting acoustical signals to leak rates through a structure, such as a closed valve or coupling, using filtering techniques and modal analysis. Also disclosed are systems and methods for testing and verification of acoustical leak rate detection. Such systems may be useful for verifying the accuracy of the conventional approaches or provide inventive systems and processes. Accuracy improvement may lead to approval of systems and methods of using AE sensors for leak rate detection in higher standard industries, such as the nuclear industry.

As described below in relation to FIGS. 1-9, a testing apparatus for simulating a leak through a structure and methods for correlating an acoustical signal with a leak rate are disclosed. The information gathered from the testing apparatus and/or correlation methods can be used in the field to determine more accurately the leak rate of a fluid or gas through the structure. Various implementations of systems and methods for determining a leak rate through a structure are described below in relation to FIGS. 10 and 11.

The described methods, systems, and apparatus should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show all of the ways in which the disclosed methods, systems, and apparatus can be used in conjunction with other systems, methods, and apparatus.

Leak Simulation System and Methods of Use

Leak simulators as disclosed herein provide a controlled environment for the establishment of empirical relationships between AE signals and the characteristics of various leak paths and corresponding leak rates. For instance, the simulators may develop look up tables that associate AE signals with known leak rates, fluid pressure differentials, and structure thicknesses. AE signals measured in the field can be compared to the AE signals in the look up tables to determine the leak rate. In addition, other variables may be simulated and associated with the AE signals to establish uncertainty values associated with the known leak rate. These other variables may include, for example, leak path geometry and the distance between the AE sensor and the leak path (as opposed to the distance between the AE sensor and the structure).

Exemplary Implementations of a Leak Simulation System

FIG. 1 is a schematic of an exemplary embodiment of a leak simulation system, or testing apparatus, that simulates a leak through a single valve. The system 100 includes a high pressure conduit 102, a low pressure conduit 104, a leak simulator 106, a compressed air tank 108 (and/or an air compressor, which is not shown), a hydraulic accumulator 110 (e.g., a piston or bladder accumulator), at least one flow meter 112, and at least one acoustic emissions (AE) sensor 114 coupled to an outer surface of the leak simulator 106. In addition, as discussed below in relation to FIG. 6, the system 100 further includes a computer system 600 having at least one processor that receives signals from the at least one AE sensor 114 and flow meter 112.

The compressed air tank 108 and hydraulic accumulator 110 pressurize water or other fluid flowing through the high pressure conduit 102 and the leak simulator 106 into the low pressure conduit 104. Conduits 102, 104 are 6" diameter schedule 80 stainless steel piping, and the water is pressurized up to about 1500 psi. Flow meter 112, which is disposed downstream of the leak path in the low pressure conduit 104, measures the rate, or volume, at which fluid flows through the leak path. The at least one AE sensor 114 receives acoustical vibrations generated by the fluid flowing through the leak path. The flow meter signal and the AE sensor signal(s) are communicated to at least one computer processor of the computer system 600. The signals are processed and stored in memory as data representing a flow rate and acoustical signal, respectively, such as is described below in relation to FIGS. 6-9. The at least one AE sensor 114 and the flow meter 112 may be calibrated prior to each test, and the calibration is documented.

Referring to FIGS. 3A-5C, the leak simulator 106 includes at least one leakage insert and an outer ring that extends circumferentially around the leakage insert. The leakage insert simulates the leak path through a structure. The outer ring simulates the thickness of the structure, such as valve wall thickness. FIGS. 3A through 4D illustrate various embodiments of leakage inserts. FIGS. 5A through 5C illustrate various embodiments of outer rings.

FIG. 3A illustrates a plan view of a leakage insert 300 according to one implementation. In particular, leakage insert 300 includes a plurality of discrete areas 302 that are distributed in a radial pattern on an incident surface 301 of the leakage insert 300. At least one leak path 303 is defined through at least one of the discrete areas 302. Thus, the leak path 303 is in communication with fluid contained by the incident surface 301 and fluid adjacent to an exiting surface that is opposite the incident surface 301. The various leak path inserts distributed around the circumference of the simulator are used to simulate leaks at one or more locations around the valve seating surface and differentiate the AE characteristics of single versus multiple path leaks. In FIG. 3A, the leakage insert 300 defines a rectangular shaped slit as the opening for the leak path 303. However, the shape of the opening to the leak path can be other shapes. For example, the leak path 303 may be a circular opening, such as the circular opening 403c shown in FIG. 4C, or a triangular opening, such as the triangular opening 403d shown in FIG. 4D.

Different leak paths are further illustrated in FIGS. 3B, 3C, 4A, and 4B. These figures provide cross sectional views of an exemplary discrete area 302, such as the cross section through the A-A line shown in FIG. 3A. In particular, FIGS. 3B and 3C illustrate a trapezoidal-shaped leak path 303b, 303c. FIG. 4A illustrates a stair-step shaped leak path 403a. FIG. 4B illustrates a V-shaped leak path 403b. Although not shown, other types of leak path shapes may be studied, such as frustoconical and diagonal leak paths, for example.

The leakage insert 300 may, as another variation, define a larger leak path opening on one side of the leakage insert 300 than on the other. For example, the trapezoidal-shaped leak path 303b shown in FIG. 3B is substantially concave as viewed from the incident surface 301b. The trapezoidal leak path 303c shown in FIG. 3C is substantially convex as viewed from the incident surface 301c. In addition, multiple leak inserts 300 may be utilized together to create multiple leak paths 303 of varying dimensions substantially simultaneously. Use of multiple leak inserts 300 allows the cumulative leak path and corresponding acoustical signal to be compared to a single leak path of substantially equivalent size.

FIGS. 5A-5C illustrate various outer rings 502a, 502b, and 502c, respectively, that may be included in the leak simulator 106. These outer rings may simulate the thickness of the structure through which the leak occurs. This thickness may impact leak rate measurements. For example, valve wall thickness acts as an attenuator (like a waveguide) for the acoustical vibrations generated by the leak. Thus, although substantially similar acoustical emissions signals are obtained from two valves, these signals may represent different levels of leakage if the valve wall thicknesses are different.

Outer ring 502a in FIG. 5A has a thickness $t_a$ as measured radially outwardly from the inner surface of the outer ring 502a to the outer surface of the outer ring 502a. Thickness $t_a$ is smaller than a thickness $t_b$ of outer ring 502b, which is shown in FIG. 5B. And, the thickness $t_b$ of outer ring 502b is smaller than a thickness $t_c$ of outer ring 502c, which is shown in FIG. 5C. In nuclear applications, there are usually six valve classes, e.g., 150-2500, which are defined by differences in valve wall thickness among other things. According to one implementation, the leak simulator 100 includes six outer rings of varying thicknesses that are used to simulate each of the six valve classes. The thickness of the valve wall will act as an attenuator and reduce the amplitude of the received signal. This attenuation effect will then result in a lower signal level for equivalent leaks for larger wall thickness. The various wall thicknesses and expected attenuation levels are therefore modeled by the simulator.

Figure 6:
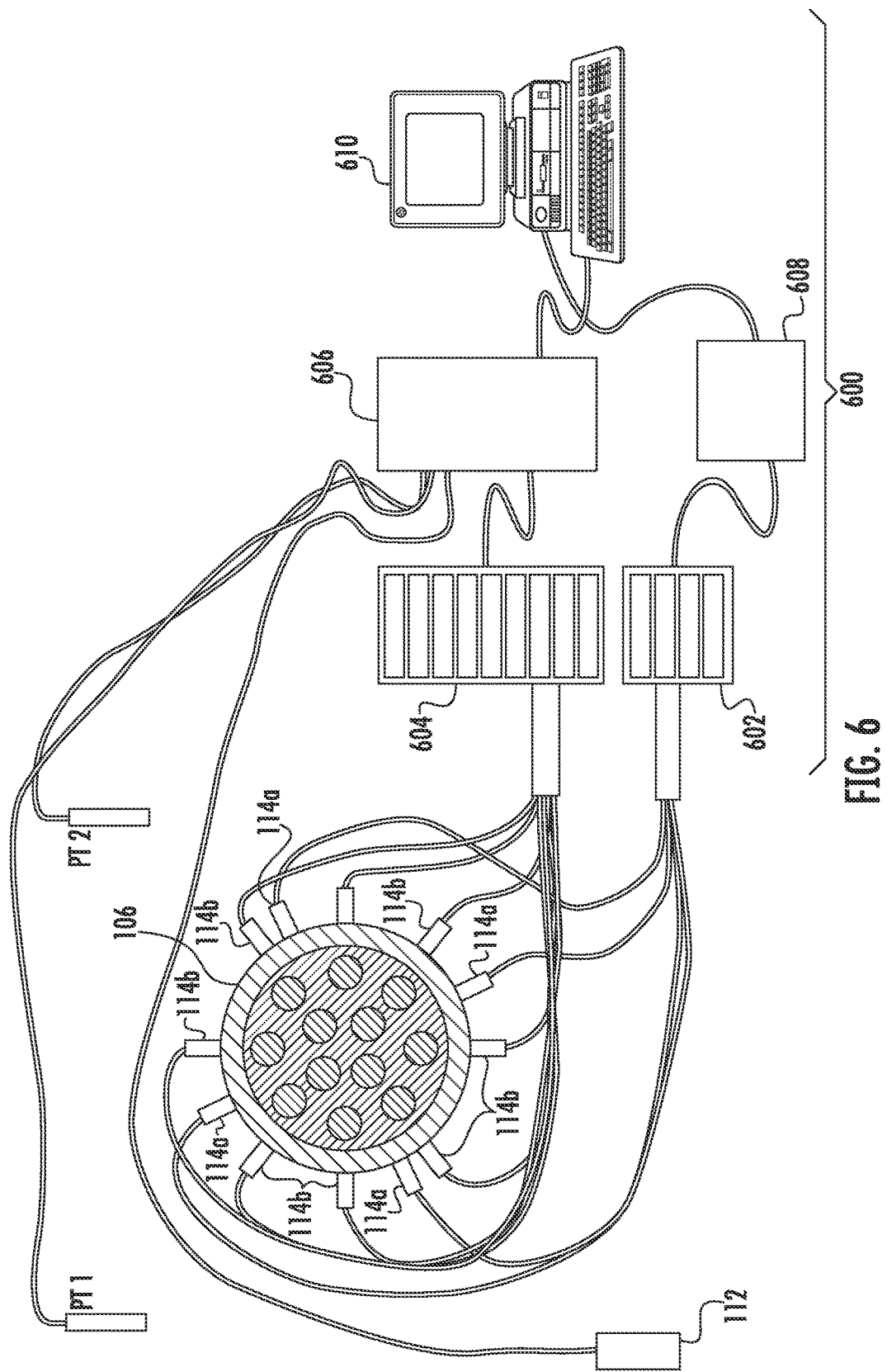
FIG. 6 illustrates a schematic of acoustic sensors, pressure sensors, flow meters, and a corresponding computer system used with the leak simulation system.

FIG. 6 illustrates a schematic diagram of AE sensors 114a, 114b coupled to the leak simulator 106, pressure transducers PT1 and PT2, flow meter 112, a filtering bank 602, an electronic board 604, data acquisition units 606 and 608, and a computing device 610 used with the leak simulation system 100. Acoustical data received by AE sensors 114a is communicated to filtering bank 602, which filters the signal data from each sensor 114a into its high and low frequency components. This filtered data is communicated to a high speed AE data acquisition unit 608 where the data is sampled, digitized and recorded at high speeds up to 2 MHz per channel. The high speed data acquisition allows for resolution of frequency events at half the sample rate which is expected to be well above the range of frequencies affected by leak noise. The processed data is then communicated by the data acquisition unit 608 to computing device 610.

Acoustical signal data received by AE sensors 114b is communicated to electronic board 604. This data is communicated to a data acquisition unit 606 (e.g., a 16-channel DAU). In addition, signals received by pressure sensor PT1 and PT2 and flow meter 112 are communicated to the data acquisition unit 606. The data acquisition unit 606 then communicates the data to the computing device 610. The analog sensor signals are converted to digital format and recorded by the DAUs. Any differences in acoustical signal due to 18-24 inches of cable between the sensors 114b and the data acquisition board 606 may be evaluated and considered in uncertainty calculations by the data acquisition units 606, 608, for example. This is also applicable to the sensors 114a used for modal analysis. The functions performed by each of these types of equipment, such as cloud based computing facilities, may be consolidated into one or more computing devices. For example, other suitable electronic data equipment may be used in place of filtering bank 602, electronic board 604, data acquisition units 606, 608, and computing device 610.

AE sensors 114a, 114b may be clamped around the surface of the valve simulator 106 and wired as described above. The sensors 114a, 114b are coupled to the leak simulator 106 with Dow 111 or other suitable alternative sealant. The sensors 114a, 114b may be attached to the surface of the leak simulator 106 with magnetic mounts and screw-type fixtures that can control the coupling force.

Pressure transducers PT1 and PT2 are disposed in high pressure conduit 102 and low pressure conduit 104, respectively, to record actual pressures and differential pressures during each test. The data from the pressure transducers PT1 and PT2 and flow meter 112 is communicated to the computing device 610 through data acquisition unit 606. Furthermore, in air tests, a bubble counter may be used instead of or in addition to flow meter 112.

Referring back to FIG. 1, the system 100 also includes a high pressure stand 118. The high pressure stand 118 provides vertical support for the high pressure conduit 102. Low pressure stand 120 provides vertical support for the low pressure conduit 104. The low pressure stand 120 may be mounted on one or more wheels 116 to facilitate removal and replacement of one or more leak simulators 106.

Also, in other implementations (not shown), steam or another gas that may or may not be subject to a phase change at the leak path may be used instead of a fluid. The steam or gas may be pressurized up to about 2250 psi, and the conduits 102, 104 may have a smaller diameter and be made of another type of stainless steel or material to accommodate the higher pressure.

Figure 2:
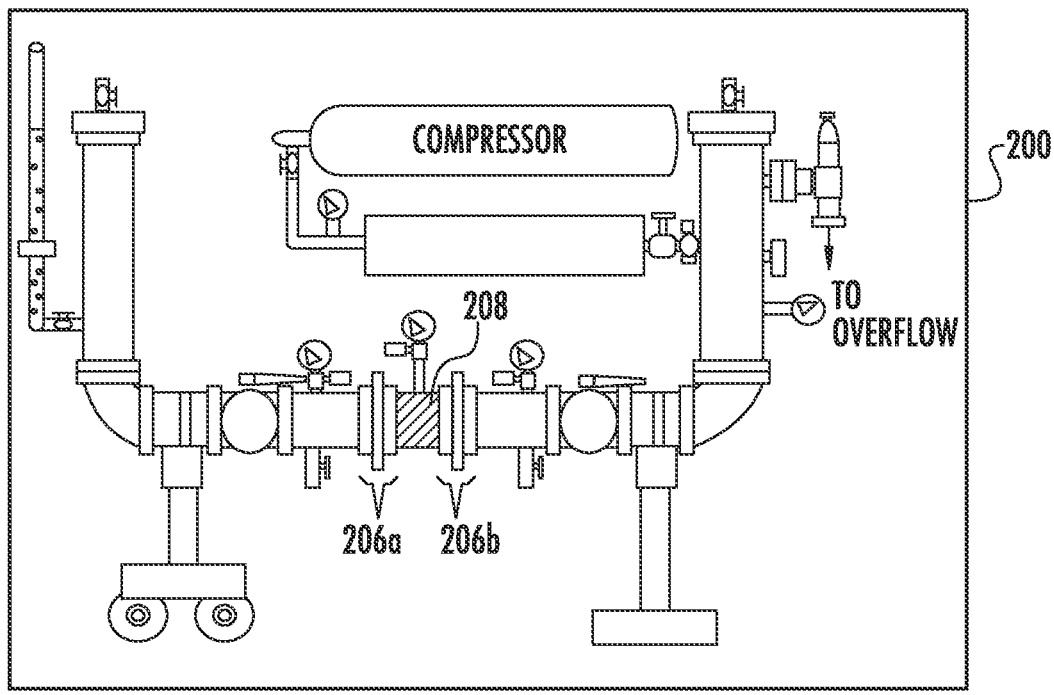
FIG. 2 is a schematic of an exemplary embodiment of a leak simulation system that simulates a leak through a double seated valve.

FIG. 2 illustrates another system 200 for simulating leaks through other structures, such as a double-seated or ball valve. The system 200 may include a spool piece 208 between two leak simulators 206a, 206b. The spool piece, with leak simulators at each end, simulates a dual seated valve such as a ball valve. The leak simulators described herein can also be used to simulate leaks through a coupling.

Exemplary Methods of Using the Leak Simulation System

Figure 7:
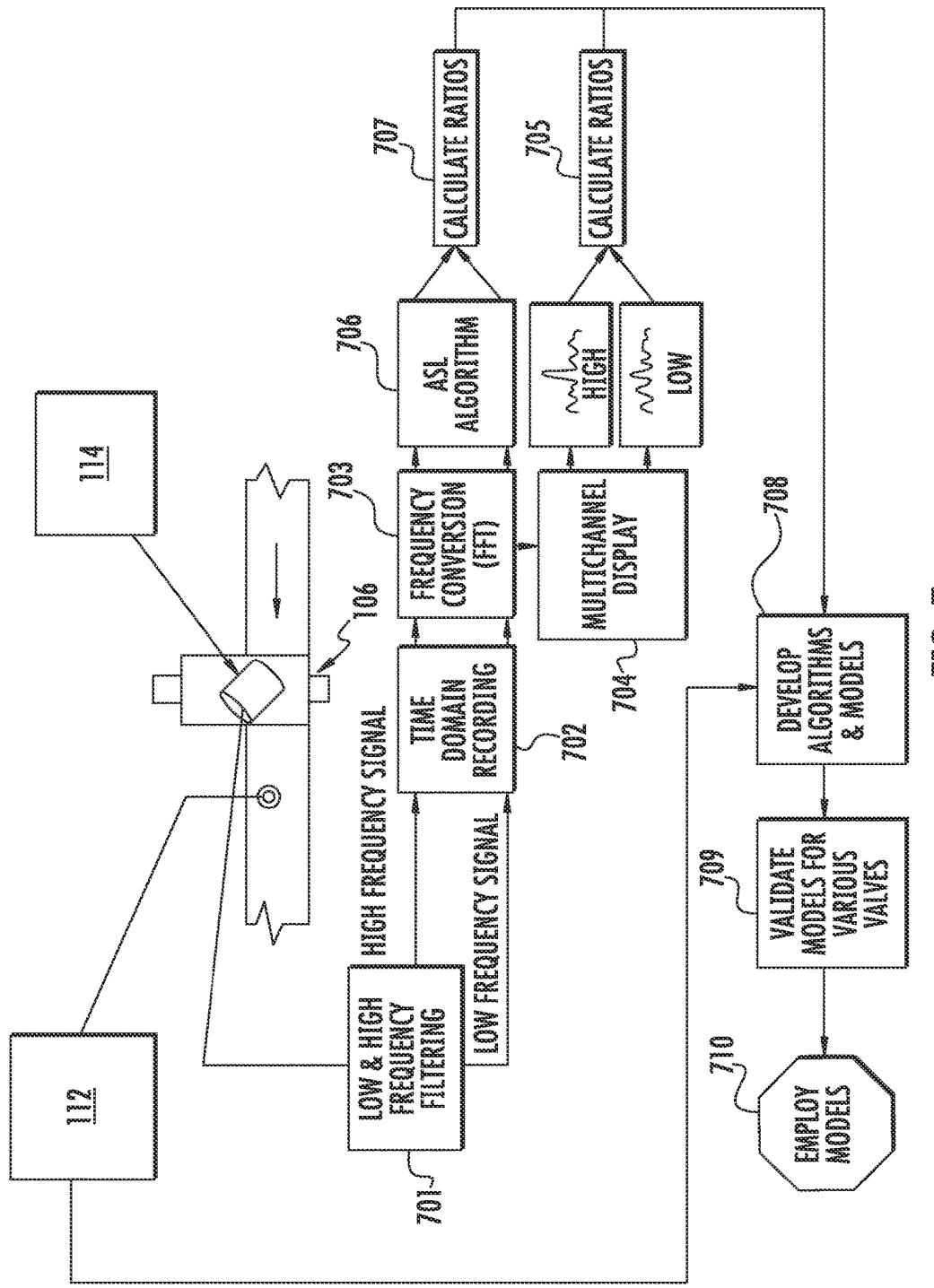
FIG. 7 illustrates a flow chart of data being processed by the leak simulation system.

FIG. 7 illustrates an exemplary schematic of system data flow and analysis. A signal from at least one AE sensor 114 is received while leak rate through the leak simulator 106 is also measured using a flow meter 112. The low and high frequency components of the AE sensor signal are filtered, as shown in Block 701. In Block 702, the high and low frequency components are recorded in the time domain.

In Block 703, the high and low frequency components are transformed from the time domain to the frequency domain (e.g., Fourier transform). The transformed data allows the shape and frequency content to be verified and closely analyzed as needed. The filtered and transformed data will be automatically analyzed in the preferred embodiment. In Block 704, the transformed components are received by a multi-channel display. A ratio of the high and low frequency components is calculated in Block 705.

In Block 706, the high and low frequency components from Block 702 are transmitted to an automated average signal length (ASL) processor such that basic analysis functions can be verified. The ASL calculations in Block 706 employ algorithms to convert the broadband AE signal to an ASL value. (The Block 706 ASL value in this implementation is not filtered into low and high frequency components.) In Block 707 a ratio of the high frequency area of interest to the low frequency area of interest is calculated for comparison to the filtered modal ratio data. In Block 708, the ratios calculated in Blocks 705 and 707 are associated with the known leak rate as measured by flow meter 112.

The associated data may be used to create models, such as algorithms or look up tables, in Block 708. In Block 709, the models created in Block 708 are validated for various valves by implementing the process on real valves in a field environment and comparing the results to appropriately calibrated leak rate instrumentation. In Block 710, the models are employed to identify leak rate in the field, such as when using certain valve and pipe structures.

Figure 8:
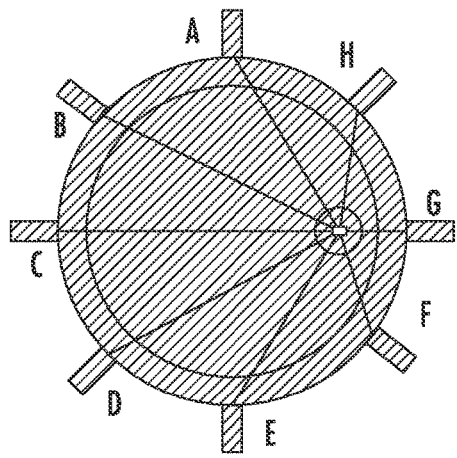
FIG. 8 illustrates exemplary average signal length data.
Figure 9:
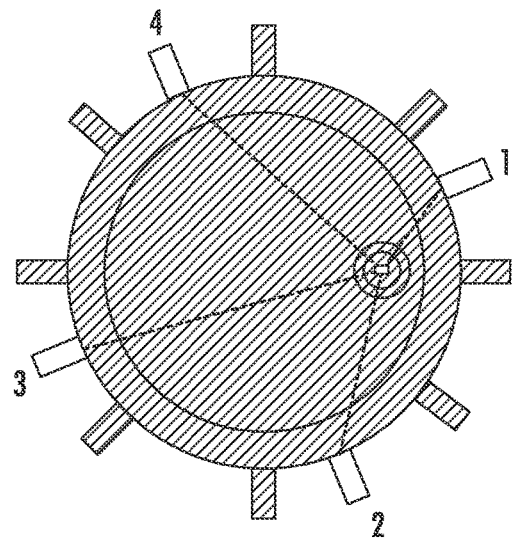
FIG. 9 illustrates exemplary data that has been transformed to the frequency domain using modal analysis.

FIGS. 8 and 9 illustrate exemplary data gathered during a leak simulation test using the leak simulation system described above in relation to FIGS. 1-7. In particular, FIG. 8 illustrates exemplary average signal length (ASL) data associated with each of eight AE sensors disposed circumferentially around the outer surface of the outer ring of the leak simulator 106. AE sensors A through H shown in FIG. 8, for example, may correspond to AE sensors 114b shown in FIG. 6. The ASL data shown in FIG. 8 has not been filtered or transformed from the time domain to the frequency domain. As shown in FIG. 8, the AE sensors disposed closest to the leak path 303 have higher ASL values than the AE sensors disposed further from the leak path 303, and the range of ASL values received by the AE sensors is from 32 to 40.

FIG. 9 illustrates exemplary AE sensor data that has been transformed to the frequency domain using modal analysis and is associated with each of four AE sensors disposed circumferentially around the outer surface of the outer ring of the leak simulator 106. AE sensors 1 through 4 shown in FIG. 9, for example, may correspond to the AE sensors 114*a* shown in FIG. 6. Similar to the ASL data in FIG. 8, the AE sensors disposed closest to the leak path 303 have a higher modal ratio than AE sensors disposed further from the leak path 303. The process(s) for validating the ASL process may use off the shelf data acquisition and analysis packages. However, modal analysis modeling may use more sophisticated data acquisition and analysis packages. The sample rates used to capture the data for the frequency domain analysis are greater than 1 MHz and benefit from more sophistication. Furthermore, to ensure that the AE sensors may be used for nuclear safety related applications (e.g., be "Q-rated"), all records associated with the project may be made available by the system for audit by the nuclear issues procurement group (NUPIC) and the US NRC vendor inspection branch. These records include the system parameters and the actual leakage measurements, calibration records for the pressure transducers, the bubble counters, and the flow meters (e.g., at the time of each test), records associating each valve simulator, leakage insert, actual valves, and other equipment used for each test, and the couplant used for coupling the AE sensors to the leak simulation system and the techniques used by the technician for coupling.

In addition, the system may record the leak rate, the upstream and downstream pressures, and the signal from each of the AE sensors taken from multiple locations around the circumference of the leak simulator as time domain waveforms. Each leakage insert (or controlled leak path) may be tested on water from 0 to 1500 psi. Additional tests may be performed to document that the difference in pressure between the upstream and the downstream sides of the leak simulator 100. These pressures can also be used in the leak rate models instead of having to use the actual pressures in each conduit. For example, 0 psi downstream and 250 psi upstream creates substantially similar results as 750 psi downstream and 1000 psi upstream.

As shown in FIGS. 8 and 9, the steel structure through which the leak occurs attenuates the AE signal. Thus, the sensors further from the leak source receive a weaker signal than sensors closer to the leak source. Accordingly, the leak location based on each AE sensor's signal strength combined with the structure's pressure class/wall thickness (e.g., valve pressure class/wall thickness) may reduce variation in the estimated leak rate results. This may lead to reduced error when measuring the leak rate in the field.

Also, the acoustical sensor data associated with each of the various leakage inserts may be used to verify that leak path geometry does not unduly influence the acoustical sensor data. The acoustical sensor data may also be used to verify that the exact distance between the sensor and the leak path (as opposed to the distance between the sensor and the leakage insert) does not unduly influence the acoustical sensor data. If the acoustical sensor data is influenced by the leak path geometry or the exact distance between the sensor and the leak path, these variations for a given leak size at a given pressure and for a given structure thickness may be considered in uncertainty calculations related to leakage quantification model(s) for these parameters.

Exemplary Leak Detection Systems and Methods of Use

AE sensors and associated computing device(s) may be used to identify a leak rate in the field by using leak rate models. The leak rate models may be created from the data gathered from the leak simulation system described above in relation to FIGS. 1-9. For example, in one implementation, a database includes look up tables in which ratios of transformed high and low frequency components from acoustical signals are associated with known flow rates through a type of structure. The ratios and associated flow rates may also be associated with structures having a certain radial thickness, that are a certain distance from the AE sensor(s), and that are used in a system with a particular pressure, pressure differential, or pressure range.

In the field, acoustical signals from each AE sensor disposed adjacent a structure are received and filtered into their respective high and low frequency components. The high and low frequency components are transformed from the time domain to the frequency domain using modal analysis, such as a Fourier transform. A ratio of the transformed high and low frequency components is calculated. The look up table associated with the type of structure is used to identify the flow rate associated with the calculated ratio. In other implementations, an algorithm may be used to identify the flow rate associated with the calculated ratio.

Figure 10:
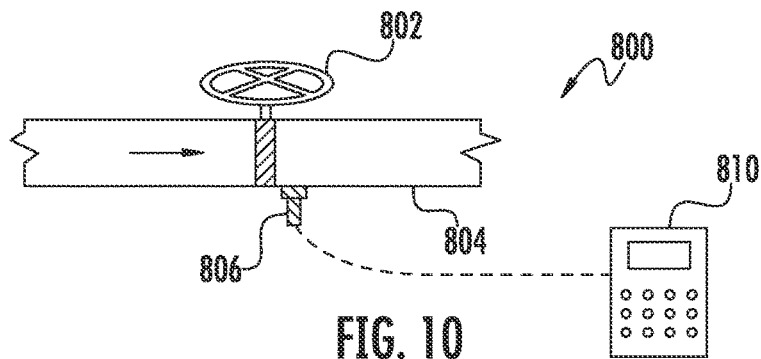
FIG. 10 illustrates an exemplary schematic of a system for determining a leak rate through an opening in a structure.
Figure 11:
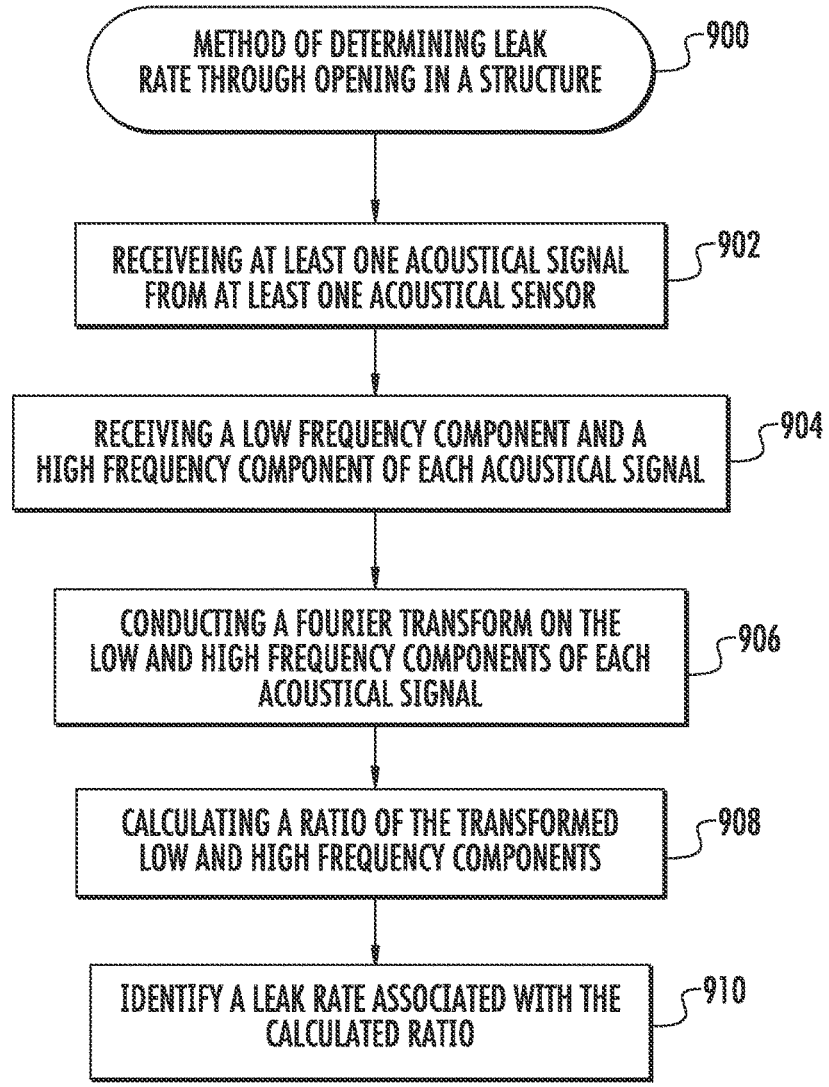
FIG. 11 illustrates a method for determining a leak rate through an opening in a structure.

FIGS. 10 and 11 illustrate embodiments of a system and method, respectively, for detecting a leak rate through an opening in a structure. In particular, as shown in FIG. 10, the leak detection system 800 includes a valve 802, a conduit 804 through which fluid or gas flows, at least one AE sensor 806 coupled to the conduit 804 a certain distance from the valve 802, and a computing device 810 in communication (e.g., wired or wireless) with the AE sensor 806.

FIG. 11 illustrates a method 900 for determining the leak rate through an opening in a structure, such as the valve 802 shown in FIG. 10. Beginning at Step 902, at least one acoustical signal is received from at least one acoustical sensor, such as AE sensor 806 shown in FIG. 10, by a processor of an associated computing device, such as computing device 810 shown in FIG. 10. In Step 904, a low and a high frequency component of each acoustical signal are received by the processor. Low and high frequencies, for example, may be around 60 kHz and 150 kHz respectively. However, these frequencies may vary depending upon factors such as pressure and leak size. This step may also include filtering of the acoustical signal by the processor of the computing device.

In Step 906, a Fourier transform is conducted on the low and high frequency components by the processor to convert each signal from the time domain to the frequency domain. The modal analysis may also be done by another processor, and the transformed components may be communicated to the processor of the computing device. In Step 908, a ratio of the transformed low and high frequency components is calculated. In Step 910, a leak rate associated with the calculated ratio is identified.

The step of identifying a leak rate associated with the calculated ratio may include executing an algorithm that provides the leak rate. Step 910 may also include retrieving the leak rate associated with the calculated ratio from a memory of the computing device, such as a database stored on computing device 810 in FIG. 10 or another computing device in communication with computing device 810. The leak rate may be associated with the calculated ratio and at least one of the following parameters: a pressure on the structure, a structure wall thickness, and an approximate distance between the leak path and the AE sensor. For example, the calculated ratio, valve wall thickness and pressure could be used to look up or calculate the leak size based on the simulator data for those same parameters. Other parameters, such as the leak path geometry and the exact distance between the leak path and the AE sensor (as opposed to the distance between AE sensor and the structure), are accounted for in uncertainty calculations associated with the leak rate. The uncertainty calculation may be determined using the testing apparatus described above in relation to FIGS. 1-6, for example.

According to various embodiments, the exemplary systems and methods described herein may enable more accurate quantification of valve leakage. For example, these systems and methods can be used to document the accuracy of the ASL approach currently employed using prior art acoustic emissions sensors, which may improve the ability to establish accurate uncertainties based on industry standards. In addition, the use of modal analysis may improve correlation accuracy with leak rate through an opening beyond what is achievable with using ASL analysis alone.

Exemplary Implementation of a Computer System

Figure 12:
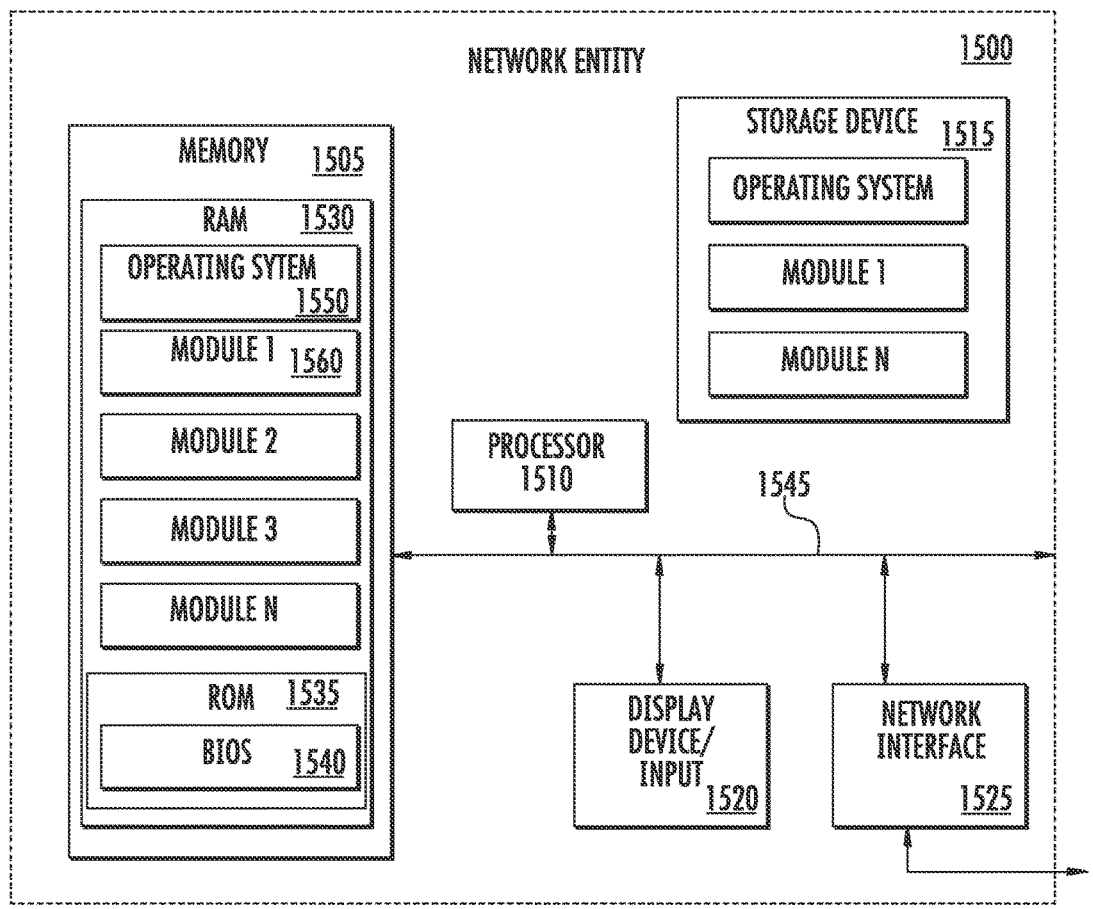
FIG. 12 illustrates a schematic diagram of a central server configured to implement a computer system.

Referring now to FIG. 12, a schematic diagram of a central server 1500, or similar network entity, configured to implement a computer system, according to one implementation of the invention, is provided for executing various functions of the leak simulation system or the leak detection system. As used herein, the designation "central" merely serves to describe the common functionality the server provides for multiple clients or other computing devices and does not require or infer any centralized positioning of the server relative to other computing devices. As may be understood from FIG. 12, the central server 1500 may include a processor 1510 that communicates with other elements within the central server 1500 via a system interface or bus 1545. Also included in the central server 1500 may be a display device/input device 1520 for receiving and displaying data. This display device/input device 1520 may be, for example, a keyboard or pointing device that is used in combination with a monitor. The central server 1500 may further include memory 1505, which may include both read only memory (ROM) 1535 and random access memory (RAM) 1530. The server's ROM 1535 may be used to store a basic input/output system 1540 (BIOS), containing the basic routines that help to transfer information across the one or more networks.

In addition, the central server 1500 may include at least one storage device 1515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1515 may be connected to the system bus 1545 by an appropriate interface. The storage devices 1515 and their associated computer-readable media may provide nonvolatile storage for a central server. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 1530. Such program modules may include an operating system 1550 and a plurality of one or more (N) modules 1560. The modules 1560 may control certain aspects of the operation of the central server 1500, with the assistance of the processor 1510 and the operating system 1550. For example, the modules may perform the functions described above and illustrated by the figures and other materials disclosed herein, such as executing various functions of the leak simulation system or the leak detection system.

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below and the disclosure above are intended to include any structure, material, or act for performing the function in combination with other claimed elements as specifically claimed. The description of the various implementations of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implentations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method of determining the leak rate of a fluid or gas through at least one opening in a structure comprising the steps of:
   receiving at least one acoustical signal from at least one acoustical sensor positioned a known distance from a structure, the acoustical signal being associated with a leak through the at least one opening in the structure;
   receiving a low frequency component and a high frequency component of the acoustical signal;
   calculating a ratio of the low frequency component to the high frequency component; and
   identifying a leak rate based on the calculated ratio.

2. The method of claim 1, wherein the step of identifying the leak rate associated with the calculated ratio comprises executing an algorithm that provides the leak rate.

3. The method of claim 1, wherein the step of identifying the leak rate associated with the calculated ratio comprises retrieving the leak rate associated with the calculated ratio from a memory of a computing device, the memory configured to store a plurality of ratios and corresponding leak rates.

4. The method of claim 1, wherein the leak rate is associated with the calculated ratio and at least one of the following: a pressure on the structure, a leak path geometry, a structure wall thickness, or a distance to a leak path from the at least one acoustical sensor.

5. The method of claim 1, further comprising the step of conducting a Fourier transform of the low frequency component and the high frequency component, wherein calculating the ratio comprises calculating the ratio of the Fourier transformed low frequency component and the Fourier transformed high frequency component.

6. The method of claim 1, further comprising determining an average signal level for each of the high frequency component and the low frequency component.

7. The method of claim 1, further comprising filtering the acoustical signal into the low frequency component and the high frequency component.

8. The method of claim 1, wherein receiving the low frequency component and the high frequency component comprises determining the low frequency component and the high frequency component of the acoustical signal.

9. The method of claim 1, wherein the structure is a valve.

10. The method of claim 1, wherein the structure is a coupling.

11. The method of claim 9 or 10, wherein the opening is a crack in the structure or a physical degradation of the valve sealing surface.

12. An acoustical sensor and computer system comprising:
   at least one acoustical sensor, the acoustical sensor configured for being disposed adjacent a structure; and
   a computing device comprising a processor in communication with the at least one acoustical sensor and a memory, the processor configured for:
      receiving at least one acoustical signal from the at least one acoustical sensor, the acoustical signal comprising a low frequency component and a high frequency component,
      calculating a ratio of the low frequency component and the high frequency component, and
      identifying a leak rate based on the calculated ratio.

13. The acoustical sensor and computer system of claim 12, wherein the processor is further configured for filtering the acoustical signal to determine the low frequency component and the high frequency component.

14. The acoustical sensor and computer system of claim 12, wherein the processor is further configured for determining the low frequency component and the high frequency component from the received at least one acoustical signal.

15. The acoustical sensor and computer system of claim 12, wherein the processor is further configured for applying a Fourier transform to the low frequency component and the high frequency component.

16. The acoustical sensor and computer system of claim 15, wherein calculating the ratio comprises calculating the ratio of the transformed low frequency component and the transformed high frequency component.

17. The acoustical sensor and computer system of claim 12, wherein identifying the leak rate associated with the calculated ratio comprises executing an algorithm that provides the leak rate.

18. The acoustical sensor and computer system of claim 12, wherein identifying the leak rate associated with the calculated ratio comprises retrieving the leak rate associated with the calculated ratio from the memory, wherein the memory is configured to store a plurality of ratios and corresponding leak rates.

19. The acoustical sensor and computer system of claim 12, wherein the leak rate is associated with the calculated ratio and at least one of the following: a pressure on the structure, a leak path geometry, a structure wall thickness, or a distance to at least one leak path from the at least one acoustical sensor.

20. The acoustical sensor and computer system of claim 19, wherein the at least one leak path is a crack in the structure.

21. The acoustical sensor and computer system of claim 12, wherein the processor is further configured for determining an average signal level for each of the high frequency component and the low frequency component.

22. The acoustical sensor and computer system of claim 12, wherein the structure is a valve.

23. The acoustical sensor and computer system of claim 12, wherein the structure is a coupling.

24. A method of correlating an acoustical signal with a leak rate of a fluid or gas through at least one opening in a structure, the steps comprising:
receiving at least one acoustical signal from at least one acoustical sensor positioned a known distance from a structure;
receiving a low frequency component and a high frequency component of the acoustical signal;
calculating a ratio of the low frequency component to the high frequency component;
associating the ratio with a known leak rate through the structure; and
storing the associated ratio as corresponding to the known leak rate in a memory of a computing device.

25. The method of claim 24, wherein the structure is a valve.

26. The method of claim 24, wherein the structure is a leak simulator.

27. The method of claim 24, wherein the structure is a coupling.

28. The method of claim 24, further comprising the step of associating the ratio and the known leak rate with a type of structure.

29. The method of claim 28, wherein the type of structure comprises at least one of an associated leak geometry and an associated structure wall thickness.

30. The method of claim 24, 28, or 29, further comprising the step of associating the ratio and the known leak rate with a pressure on the structure.

31. The method of claim 24, 28, or 29, further comprising the step of associating the ratio and the known leak rate with a distance to the opening from the at least one acoustical sensor.

32. The method of claim 31, wherein:
the at least one opening comprises a first opening and a second opening,
the distance from the acoustical sensor comprises a first distance to the first opening and a second distance to the second opening, and
the ratio and the known leak rate are associated with the first and second distances.

33. The method of claim 24, wherein:
receiving the acoustical signal comprises receiving a first acoustical signal from a first acoustical sensor and a second acoustical signal from a second acoustical sensor, the first acoustical sensor being disposed a first distance from the opening, and the second acoustical sensor being disposed a second distance from the opening, wherein the first and second distances are different,
receiving the low frequency component and the high frequency component of the acoustical signal comprises receiving a first low frequency component and a first high frequency component of the first acoustical signal and a second low frequency component and a second high frequency component of the second acoustical signal,
calculating the ratio of the low frequency component to the high frequency component comprises calculating a first ratio of the first low frequency component to the first high frequency component and calculating a second ratio of the second low frequency component to the second high frequency component;
associating the ratio with the known leak rate comprises associating the first ratio with the known leak rate and the first distance and associating the second ratio with the known leak rate and the second distance; and
storing the associated ratio and the known leak rate in the memory of the computing device comprises storing the associated first ratio with the known leak rate and the first distance and storing the associated second ratio with the known leak rate and the second distance.

34. The method of claim 33, wherein:
the at least one opening comprises a first opening and a second opening,
the first distance from the first acoustical sensor comprises a third distance to the first opening and a fourth distance to the second opening, and the second distance from the second acoustical sensor comprises a fifth distance to the first opening and a sixth distance to the second opening, and
the first ratio is associated with the known leak rate and the third and fourth distances, and the second ratio is associated with the known leak rate and the fifth and sixth distances.

35. The method of claim 24, further comprising conducting a Fourier transform of the low frequency component and the high frequency component, wherein calculating the ratio of the low frequency component to the high frequency component comprises calculating the ratio of the transformed low frequency component to the transformed high frequency component.

36. The method of claim 35, further comprising the step of determining an average signal level for each of the high frequency component and the low frequency component.

37. The method of claim 24, further comprising filtering the at least one acoustical signal to determine the low frequency component and the high frequency component.

38. A testing apparatus comprising:
a leak simulator disposed between a high pressure conduit and a low pressure conduit, the leak simulator comprising at least one leakage insert that defines at least one leak path, the at least one leak path being in communication with the high pressure conduit and the low pressure conduit; and a processor in communication with at least one acoustical sensor, the processor configured for:
  receiving at least one acoustical signal from the at least one acoustical sensor, the at least one acoustical signal comprising a low frequency component and a high frequency component,
  calculating a ratio of the low frequency component and the high frequency component,
  associating the calculated ratio with a leak rate through the leak path, and
  storing the ratio as corresponding to the leak rate in a memory of a computing device.

39. The testing apparatus of claim 38, wherein the processor is further configured for applying a Fourier transform to the low frequency component and the high frequency component, and calculating the ratio of the low frequency component and the high frequency component comprises calculating the ratio of the transformed low frequency component and the transformed high frequency component.

40. The testing apparatus of claim 38, wherein the at least one acoustical sensor is disposed adjacent an outer surface of the leakage insert and a known distance from the leak path.

41. The testing apparatus of claim 38, wherein the leak simulator comprises at least two leakage inserts, the at least two leakage inserts defining the leak path through the leak simulator.

42. The testing apparatus of claim 41, wherein the leak simulator further comprises at least one spool between the two leakage inserts to simulate a double seated valve.

43. The testing apparatus of claim 38, wherein the processor is further configured for associating the calculated ratio and the leak rate with at least one of the pressure on the leak simulator, a leak path geometry associated with the leak path, the thickness of the leakage insert, or the distance between the acoustical sensor and the leak path.

44. The testing apparatus of claim 38, further comprising a first acoustical sensor mounted a first distance from the leak path and a second acoustical sensor mounted a second distance from the leak path, the first distance and the second distance being different.

45. The testing apparatus of claim 38, further comprising a first pressure transducer and a second pressure transducer, the first pressure transducer configured for receiving a first pressure signal from a fluid or gas leak through the high pressure conduit and the second pressure transducer configured for receiving a second pressure signal from a fluid or gas leak through the low pressure conduit.

46. The testing apparatus of claim 38, further comprising a bubble counter.

47. The testing apparatus of claim 38, further comprising at least one calibrated flow meter configured for recording leakage through the leak path.

48. The testing apparatus of claim 38, wherein the low pressure conduit is mounted on at least one wheel.

49. The testing apparatus of claim 38, wherein the processor is further configured for determining an average signal level from the acoustical signal.

* * * * *